US012254436B1

(12) United States Patent
Ruffkess et al.

(10) Patent No.: US 12,254,436 B1
(45) Date of Patent: *Mar. 18, 2025

(54) PACKAGE SECURING SYSTEM

(71) Applicant: BOXLOCK, INC., Atlanta, GA (US)

(72) Inventors: Brad Ruffkess, Atlanta, GA (US); Hugo Giralt Echevarria, Oakland, CA (US); Siddharth Vanchinathan, Oakland, CA (US); Alejandro Castillejo Muñoz, San Francisco, CA (US); Mauro Alencar, San Rafael, CA (US)

(73) Assignee: BoxLock, Inc., Atlanta, GA (US)

( * ) Notice: Subject to any disclaimer, the term of this patent is extended or adjusted under 35 U.S.C. 154(b) by 574 days.

This patent is subject to a terminal disclaimer.

(21) Appl. No.: 17/686,935

(22) Filed: Mar. 4, 2022

Related U.S. Application Data

(63) Continuation of application No. 15/586,512, filed on May 4, 2017, now Pat. No. 11,288,617.

(51) Int. Cl.
  *G06Q 10/083* (2024.01)
  *G07C 9/20* (2020.01)

(52) U.S. Cl.
  CPC ............. *G06Q 10/083* (2013.01); *G07C 9/20* (2020.01)

(58) Field of Classification Search
  CPC .................................................. G06Q 10/083
  See application file for complete search history.

(56) References Cited

U.S. PATENT DOCUMENTS

| | | | |
|---|---|---|---|
| 5,189,893 A | 3/1993 | Kortenbrede | |
| 5,624,071 A | 4/1997 | Sosan | |

(Continued)

FOREIGN PATENT DOCUMENTS

| | | | |
|---|---|---|---|
| AU | 2007201243 A1 | 10/2008 | |
| AU | 2014100457 A4 | 6/2014 | |

(Continued)

OTHER PUBLICATIONS

Accurate Electronics, Access Controls, https://web.archive.org/web/20161221182804/https://www.accurateelectronics.com/access-controls.html, Dec. 21, 2016 (Year: 2016) (Year: 2016).*

(Continued)

*Primary Examiner* — Rupangini Singh
(74) *Attorney, Agent, or Firm* — Morris, Manning & Martin, LLP; Daniel E. Sineway, Esq.; Daniel T. Begasse, Esq.

(57) ABSTRACT

A package securing system operable to facilitate the ability for an individual expecting to receive a package to provide and control a secure environment for receiving the package wherein the individual can execute the security protocols remotely. The package securing system further includes a lock having a body, a shank with keeper operably secured thereto, a solenoid with piston, a scanner and a controller. The controller provides operation of the lock and is operably coupled to the Internet via a wireless communication protocol. The controller is communicably coupled to a software application wherein the software application provide an interface for operation of the package securing system. The lock is unlocked and locked utilizing a machine-readable dataset wherein the machine-readable dataset is associated with an expected package and communicated to the controller via the software application. A server is provided to execute portions of the operational method of the present invention.

20 Claims, 4 Drawing Sheets

(56) References Cited

U.S. PATENT DOCUMENTS

| | | |
|---|---|---|
| 6,047,573 A | 4/2000 | Martinez |
| 6,047,575 A | 4/2000 | Larson et al. |
| 6,384,711 B1 | 5/2002 | Cregger et al. |
| 6,442,983 B1 | 9/2002 | Thomas et al. |
| 6,584,815 B2 | 7/2003 | Bremicker |
| 6,696,918 B2 | 2/2004 | Kucharczyk et al. |
| 6,761,051 B1 | 7/2004 | Tsai |
| 7,552,607 B2 | 6/2009 | Yang |
| 7,562,545 B2 | 7/2009 | Lai et al. |
| 7,934,405 B2 | 5/2011 | Burmesch et al. |
| 8,225,629 B2 | 7/2012 | Zuraski et al. |
| 8,453,481 B2 | 6/2013 | Meekma |
| 8,806,907 B2 | 8/2014 | Kalous et al. |
| 8,850,858 B2 | 10/2014 | Nave |
| 9,646,165 B1 | 5/2017 | Saylor |
| 2002/0103653 A1 | 8/2002 | Huxter |
| 2006/0283216 A1 | 12/2006 | Marcelle et al. |
| 2007/0126551 A1 | 6/2007 | Slevin |
| 2010/0283575 A1 | 11/2010 | Tubb et al. |
| 2012/0011366 A1 | 1/2012 | Denison |
| 2013/0036781 A1* | 2/2013 | Hartmann ............... E05B 45/06 340/542 |
| 2013/0086956 A1 | 4/2013 | Nave |
| 2014/0100687 A1 | 4/2014 | Ekstrom et al. |
| 2014/0188637 A1 | 7/2014 | Balasubramaniam et al. |
| 2015/0066797 A1 | 3/2015 | Outwater et al. |
| 2015/0120529 A1 | 4/2015 | Faaborg |
| 2015/0213403 A1 | 7/2015 | Dorpfeld et al. |
| 2015/0225986 A1 | 8/2015 | Goldman |
| 2015/0292244 A1* | 10/2015 | Beatty ................. E05B 47/0012 70/20 |
| 2015/0310381 A1 | 10/2015 | Lyman et al. |
| 2016/0066733 A1 | 3/2016 | Gozar |
| 2016/0159496 A1 | 6/2016 | O'Toole |
| 2016/0217637 A1* | 7/2016 | Gengler ................. E05B 67/22 |
| 2016/0275450 A1 | 9/2016 | Chang |
| 2016/0331171 A1* | 11/2016 | Jiang .................... A47G 29/141 |
| 2017/0009491 A1 | 1/2017 | Nguyen et al. |
| 2018/0060812 A1* | 3/2018 | Robinson ............ G06Q 10/1093 |

FOREIGN PATENT DOCUMENTS

| | | |
|---|---|---|
| CN | 104732597 A | 6/2015 |
| CN | 105788095 A | 7/2016 |
| CN | 105957266 A | 9/2016 |
| CN | 106355364 A | 1/2017 |
| CN | 106504434 A | 3/2017 |
| CN | 107221092 A | 9/2017 |
| DE | 102013222422 A1 | 5/2015 |
| FR | 3025823 A1 | 3/2016 |
| GB | 2483474 A | 3/2012 |
| GB | 2520698 A | 6/2015 |
| JP | 2002153373 A | 5/2002 |
| JP | 2006053704 A | 2/2006 |
| JP | 2008027182 A | 2/2008 |
| JP | 2016211348 A | 12/2016 |
| WO | 2016164494 A1 | 10/2016 |
| WO | 2017210797 A1 | 12/2017 |

OTHER PUBLICATIONS

Accurate Electronics: "Access Controls," 2016, 2 Pages, [Retrieved on Dec. 21, 2016] Retrieved from URL: https://web.archive.org/web/20161221182804/https://www.accurateelectronics.com/access-controls.html.

Extended European Search Report for European Application No. 18884498.9, mailed Jul. 26, 2021, 9 Pages.

Final Office Action for U.S. Appl. No. 15/586,512, mailed Sep. 2, 2020, 56 Pages.

International Preliminary Report on Patentability for International Application No. PCT/US2018/062834, mailed Jun. 11, 2020, 6 Pages.

International Search Report and Written Opinion for International Application No. PCT/US2018/062834, mailed Feb. 8, 2019, 7 Pages.

International Search Report and Written Opinion for International Application No. PCT/US2019/019374, mailed May 1, 2019, 11 pages.

Non-Final Office Action for U.S. Appl. No. 15/586,512, mailed Mar. 5, 2020, 26 Pages.

Non-Final Office Action for U.S. Appl. No. 15/586,512, mailed Mar. 16, 2021, 64 Pages.

Non-Final Office Action for U.S. Appl. No. 16/220,527, mailed Oct. 1, 2020, 8 Pages.

Non-Final Office Action for U.S. Appl. No. 16/767,897, mailed on May 9, 2024, 13 pages.

* cited by examiner

PACKAGE SECURING SYSTEM

CROSS REFERENCE TO RELATED APPLICATIONS

This application is a continuation and claims priority to and benefit of U.S. patent application Ser. No. 15/586,512, filed May 4, 2017, entitled "Package Securing System", the disclosure of which is incorporated by reference in its entirety herein.

FIELD OF THE INVENTION

The present invention relates generally to security devices, more specifically but not by way of limitation, a package securing system operable to securely lock a container wherein the package securing system includes a lock having a scanner that is configured to facilitate the unlocking of the locking device ensuing scanning of an approved barcode or similar machine readable representation of data.

BACKGROUND

Package delivery to single family homes is a routine occurrence that is executed by many companies every day in the United States. Typically when the packages are delivered and no resident is available at the delivery address, the package is left by the front door of the structure. Package theft has been on the rise for many years and now totals an estimated 11 million packages annually. Approximately 26% of homeowners receive a package once a week and approximately 39% receive a package at least once a month. Package recipients typically worry about theft when they are unavailable to be at the receiving location during the scheduled delivery time. This concern typically escalates during the holiday season as package volume increases and as such package theft also rises during this time period. About 75% of packages are stolen during the day when the homeowner is not at home.

One problem with existing package delivery services is that the delivery provider typically provides a large time window for when the package will be delivered to the destination address. These large time windows make it difficult for the homeowner to wait for a package to be delivered. Additionally, there is no means available to the homeowner to provide a secure receiving container for a package to be placed in upon delivery. Receiving containers and the like that may use a lock would require a key and/or a combination and the ability to provide these to delivery organizations is really not feasible. Lastly, while some delivery organizations will accommodate request to place delivered packages either out of sight or in an alternate location such as a backyard, most delivery organizations cannot accommodate such requests.

Accordingly, there is a need for a package securing system that provides a means of securely receiving a package wherein the package recipient is able to provide a dataset to the delivery organization wherein the dataset is in the form of a bar code or similar machine-readable data and wherein the dataset provides a means to unlock the locking device.

SUMMARY OF THE INVENTION

It is the object of the present invention to provide a package securing system that having a portion is configured to be secured to a receiving container designed to receive packages that includes a lock that is operable utilizing a machine-readable dataset.

A further object of the present invention is to provide a package securing system that is configured to secure packages at the delivery destination wherein the lock includes a controller operable receive, store, manipulate and transmit data.

Another object of the present invention is to provide a package securing system having a portion that is configured to be secured to a receiving container designed to receive packages wherein the lock of the package securing system further includes a scanner operable to scan machine-readable data images.

Still a further object of the present invention is to provide a package securing system that is configured to secure packages at the delivery destination wherein the lock of the present invention further includes a position sensor that is configured to detect and transmit the lock/unlocked position of the locking device.

An additional object of the present invention is to provide a package securing system having a portion that is configured to be secured to a receiving container designed to receive packages wherein the lock of the package securing system further includes the necessary electronics to be operably coupled to a conventional WiFi router.

An alternative object of the present invention is to provide a package securing system that is configured to secure packages at the delivery destination that further includes a software application configured to facilitate the operation of the package securing system.

Another object of the present invention is to provide a package securing system having a portion that is configured to be secured to a receiving container that further includes at least one server computer that is operably coupled to the software application.

Still a further object of the present invention is to provide a package securing system that is configured to secure packages at the delivery destination wherein the server computer provides functions such as but not limited to providing of single use machine-readable data images.

Yet another object of the present invention is to provide a package securing system having a portion that is configured to be secured to a receiving container wherein the method of use facilitates the exchange of a machine-readable dataset between a package recipient and a package delivery organization.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the present invention.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
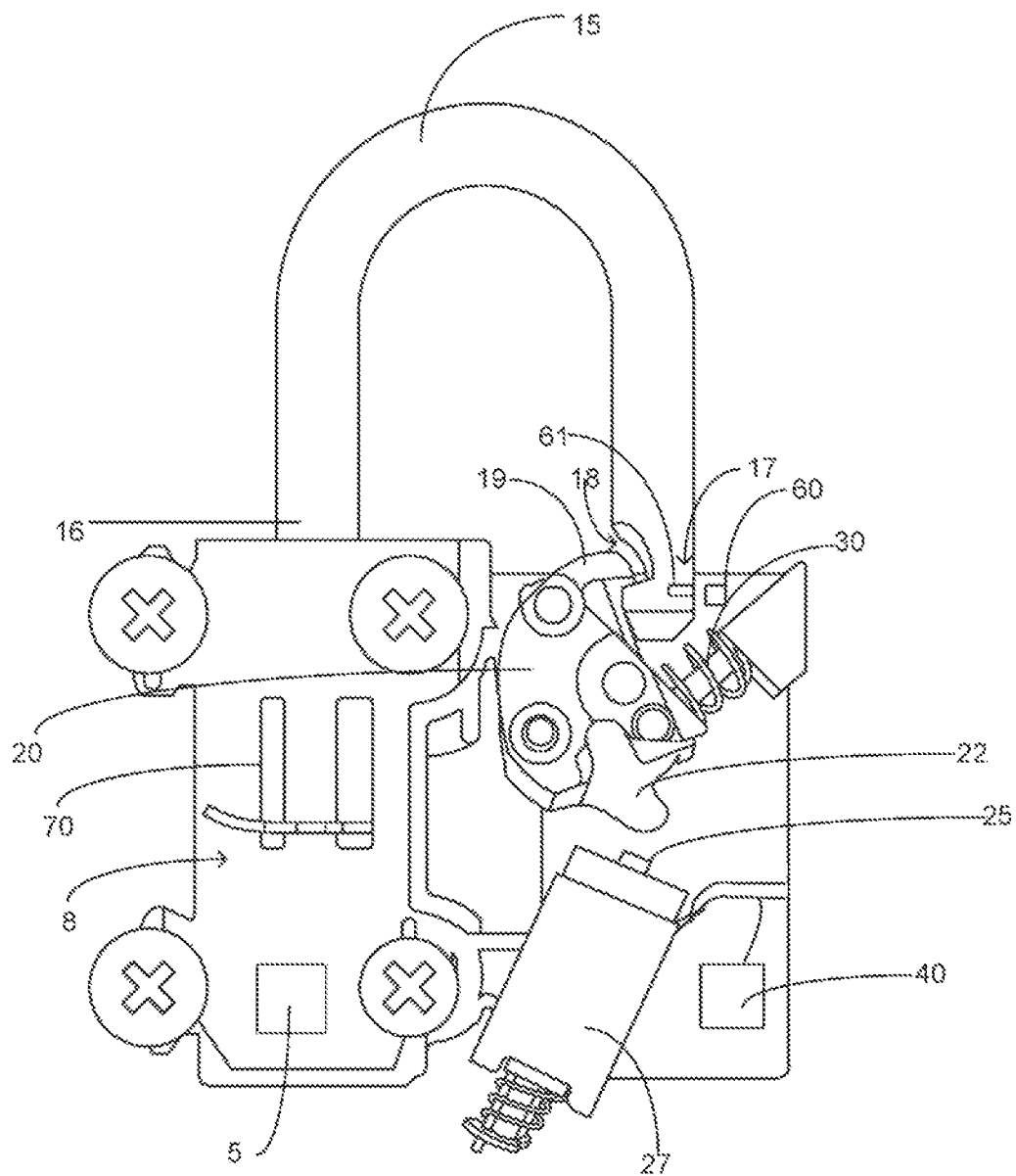
FIG. 1 is a schematic diagram of the lock of the present invention.

Referring now to the drawings submitted herewith, wherein various elements depicted therein are not necessarily drawn to scale and wherein through the views and figures like elements are referenced with identical reference numerals, there is diagrammed package securing system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Now referring in particular to FIG. 1 herein, the package securing system 100 includes lock 10. Lock 10 is configured to be releasably secured to a container that is constructed to have an interior volume and access door wherein the access door is constructed so as to receive the shank 15 of the lock 10. It is contemplated within the scope of the present invention that the lock 10 could be constructed in numerous alternate manners so as to mateably engage with a portion of a receiving container in order to provide restricted access thereto. The shank 15 is constructed of a durable rigid material such as but not limited to metal and is formed in a u-shape having a first end 16 and second end 17 operably coupled with body 8 of lock 10. The shank 15 is configured to be movably coupled to body 8 such that the shank 15 is movable in an upwards-downwards direction so as to provide disengagement of the second end 17 with body 8 in order to execute the unlocking of the lock 10. Second end 17 includes notch 18 that is operably coupled with latch 19 of keeper 20. Latch 19 is movable intermediate a first position and a second position wherein in the first position the latch 19 is engaged with notch 18 so as to inhibit upward movement of the shank 15. In its second position, the latch 19 is removed from the notch 18 so as to permit upward movement of the shank 15 thereby allowing the lock 10 to be moved to an unlocked position. The keeper 20 further includes a spring 30 that is operable to bias the latch 19 in its first position. Keeper 20 includes tab 22 positioned near the bottom of the keeper 20 so as to be operably engaged with piston 25 of solenoid 27. As will be further discussed herein, piston 25 is movable to engage tab 22 so as to initiate movement of latch 19 from its first position to its second position. The solenoid 27 is a conventional electric solenoid that is electrically coupled to the power supply 5 and controller 40. Ensuing activation of the solenoid 27, the piston 25 extends outward thus contacting tab 22 which pivots latch 19 to its second position wherein the latch is temporarily disengaged from notch 18.

A shank position sensor 60 is mounted within the body 8 having a portion 61 embedded into the second end 17 of shank 15. The shank position sensor 60 is configured to detect and subsequently transmit the position of the shank 15 as to whether or not the shank 15 is in a locked or unlocked position. The shank position sensor 60 is operably coupled to controller 40 wherein the controller 40 receives the data signal from the shank position sensor 60 concerning the position of the shank 15. It is contemplated within the scope of the present invention that the shank position sensor 60 and portion 61 could utilize various technologies to detect the movement of the position of the second end 17 of the shank 15. By way of example but not limitation, the portion 61 could be a magnet operably coupled with the shank position sensor 60 so as to detect the position of the second end 17 of the shank 15.

Disposed within the body 8 is power supply 5. Power supply 5 is a conventional lithium ion battery that is configured to provide the necessary power for operation of the lock 10 and solenoid 27 as is described herein. Those skilled in the art will recognize that the power supply 5 could be manufactured from alternate conventional portable power sources in place of a lithium ion battery. The power supply 5 is operably coupled to controller 40. Controller 40 includes the necessary electronics to store, receive, transmit and manipulate data. It is contemplated that the controller 40 could be manufactured utilizing numerous styles of electronics but good results have been achieved by utilizing a raspberry pi single board computer having a USB shield. The controller 40 functions to provide the operation of the lock 10 as described herein. Controller 40 is operably coupled to solenoid 27 and scanner 70 disposed within the body 8. The controller 40 further includes a transceiver that is configured to transmit and receive data signals utilizing conventional WiFi communication protocols.

Scanner 70 is disposed within the body 8 and is configured to scan machine-readable datasets such as but not limited to QR codes or barcodes. The scanner 70 is a conventional data image scanner utilizing an illuminator, decoder and sensor converter to read and decipher a machine-readable dataset. The scanner 70 is electrically coupled to the power supply 5 and is further operably coupled to the controller 40 wherein the controller 40 and scanner 70 exchange data signals therebetween. While not particularly illustrated herein, it is contemplated within the scope of the present invention that the scanner 70 would be operably coupled to an interface, such as but not limited to a button in order to activate the scanner 70 so as to scan a machine-readable dataset.

Figure 2:
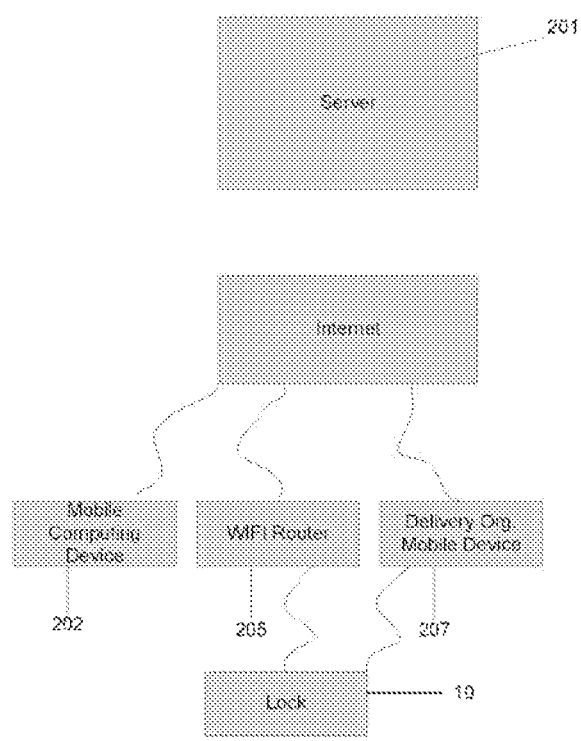
FIG. 2 is a block diagram of the operational components of the present invention.

Referring now in particular to FIG. 2 herein, a block diagram of the operational elements of the present invention are illustrated therein. The package securing system 100 includes at least one server 201. The server 201 is a conventional computer server having the necessary electronics to store, receive, transmit and manipulate data signals. The server 201 is operably coupled to the Internet utilizing conventional communication protocols. The server further provides the storage of the software application of the present invention wherein a user can access and download via the Internet. A mobile computing device 202 is further included wherein the mobile computing device 202 is configured to communicably couple to the server 201 via the Internet for accessing the software application of the present invention stored thereon. The package securing system 100 utilizes a router 205 to communicably couple the lock 10 with the mobile computing device 202 and the server 201. It is contemplated within the scope of the present invention that the mobile computing device 202 could be an exemplary smart phone. A delivery organization mobile device 207 is communicably coupled to the server 201 wherein the delivery organization mobile device is a conventional mobile computing device and operable to display a machine-readable dataset for scanning by lock 10 wherein verification thereof is executed by the server 201.

Figure 3:
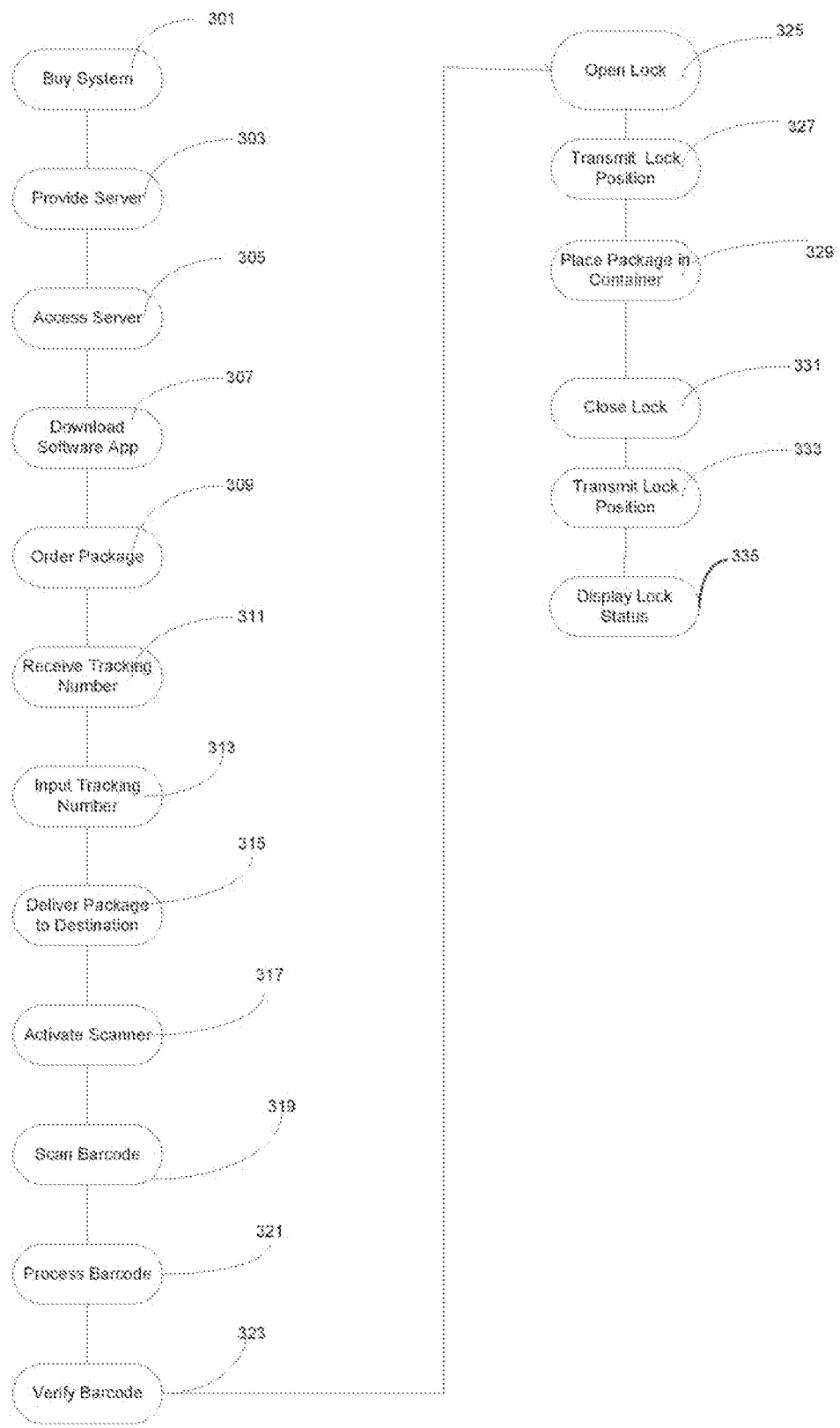
FIG. 3 is a flow chart of the process of the method facilitated by the software application of the present invention.

Referring in particular to FIG. 3, the method of the package securing system 100 is outlined therein. The package securing system 100 includes step 301 wherein a consumer will purchase the package securing system 100. In step 303, the operator of the package securing system 100 will provide the server 201 and communicably couple the server to the Internet. Step 305, the user will access the server 201. In step 307, the software application of the present invention will be downloaded from the server 201 to a mobile computing device 202. In step 309, the user of the package securing system 100 will order a package of goods from a supplier. Step 311, the supplier of the package of goods will provide a shipping tracking number to the user. In step 313, the user will utilize the software application of the present invention loaded onto the mobile computing device 202 to input the received tracking number. The received tracking number is transmitted to the server and is identified as being associated with a pending delivery. Step 315, a delivery organization will deliver the package to its intended destination. In step 317, the scanner 70 of the lock 10 will be activated. Step 319, a machine-readable dataset having the provided tracking number will be scanned by the scanner 70. In step 321, the scanner 70 will transmit the acquired data signal from the scan to the controller 40 wherein the controller 40 subsequently transmits the data signal to the server 201 for verification of accuracy with the tracking number associated with the pending delivery.

In step 321, the server will verify the tracking number and transmit a verification signal to the controller 40. Ensuing receipt of the verification signal, step 325, the controller 40 will activate the solenoid 27 so as to open the lock 10 allowing access to a receiving container to which the lock 10 is secured. In step 328, the shank position sensor 60 will transmit a signal to the mobile computing device 202 with notification of being transitioned to an open position. In step 329, the delivery organization will place the package into the receiving container. Step 331, the delivery organization will move the shank 15 to its first position so as to lock the shank 15. In step 333, the controller 40 will transmit a signal to the mobile computing device 202 providing notification of the status of lock 10 being moved to a locked position. In step 335, at anytime during the aforementioned process, the position of the lock 10, i.e. locked or unlocked is displayed on the mobile computing device 202 or can be obtained through a notification request function of the software application of the present invention.

Figure 4:
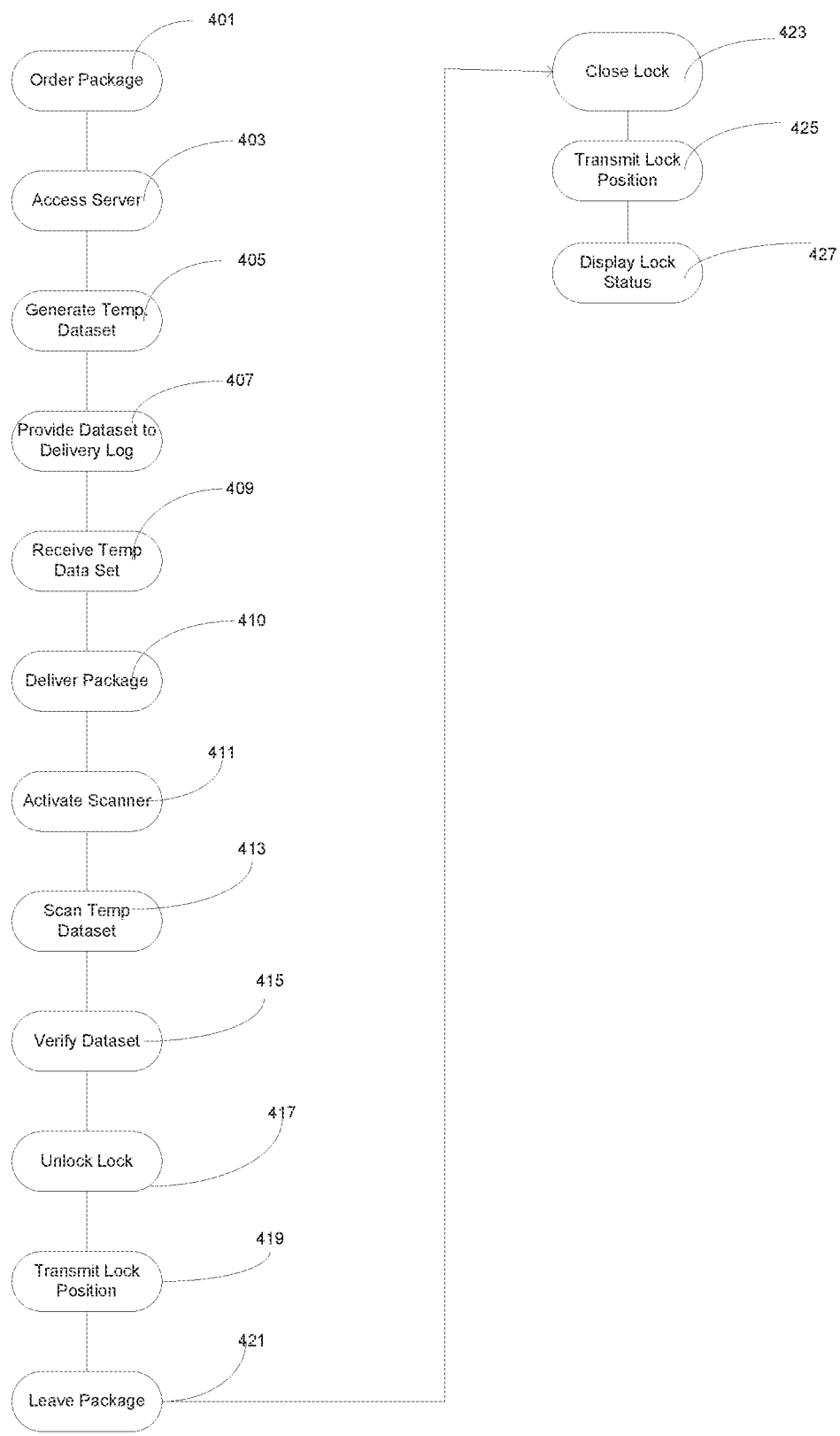
FIG. 4 is a flow chart of an alternate process method of the present invention.

In FIG. 4 herein, an alternative embodiment of operation of the package securing system 100 is outlined therein. In step 401, a user will order a package of good to be delivered. Step 403, the user will access the server 201 via the software application on the mobile computing device 202. In step 405, the user will request generation of a temporary dataset, wherein the dataset is a machine-readable dataset such as but not limited to a barcode or QR code. Step 407, the user will transmit the generated dataset to be associated with the pending package for delivery to the delivery organization responsible for delivering the package. It is contemplated within the scope of the present invention that the generated dataset could be transmitted to the delivery organization utilizing an email or similar electronic form of communication. In step 409, the delivery organization will receive the generated dataset. Step 410, the delivery organization will deliver the package to the specified destination. In step 411, the scanner 70 on the lock 10 will be activated. Step 413, the delivery organization will present the generated dataset utilizing a delivery organization mobile computing device 207 for scanning thereof. In step 415, the scanner 70 will scan the generated dataset and transmit to the server 201 for verification thereof. Step 417, ensuing verification of the generated dataset the controller 40 will move the lock 10 to an unlocked position. In step 419, the controller 40 will transmit a signal to the mobile computing device 202 a signal that the status position of the lock 10 has changed to unlocked. Step 421, the delivery organization will leave the package in the container to which the lock 10 is operably coupled. In step 423, the lock 10 is returned to its locked position. In step 425, the controller 40 will transmit to the mobile computing device 202 a data signal indicating the lock 10 has been returned to a locked position. Step 427, the controller 40 will provide a lock 10 status notification to the software application on the mobile computing device 202 of the status of the lock 10 at any point during the operational process.

It is further contemplated within the scope of the present invention, that a user having a mobile computing device 202 paired with a lock 10 could utilize the software application to transmit a signal to unlock the lock 10 at anytime for an individual to access the container to which the lock 10 is operably coupled. While the method of operation described herein provides the order of execution for receipt of a delivered package, it is contemplated within the scope of the present invention that the order of execution could be minimally altered in order to facilitate the arrangement of a package pickup from the container to which the lock 10 is secured.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A system for secure item delivery, comprising:
 a lock comprising a housing defining an internal cavity, wherein an embedded controller and a shank position sensor are disposed within the internal cavity and a shank is at least partially disposed within the internal cavity, further comprising an embedded data image scanner disposed at least partially within the internal cavity and having a scanning interface capable of scanning an item external to the housing, and further wherein the lock is located at a particular location; and
 a server in operative communication with the embedded controller of the lock, wherein the server comprises a processor and is operative to:
  receive an item tracking number associated with an item for delivery to the particular location;
  receive a signal comprising machine-readable data transmitted from the embedded controller of the lock, wherein the machine-readable data is scanned from the item via the scanning interface of the embedded data image scanner;
  extract a particular tracking number from the machine-readable data;
  determine that the particular tracking number matches the item tracking number;
  receive a position of the lock from the shank position sensor, the position of the lock identifying the shank in a locked position; and
  upon determining that the particular tracking number matches the item tracking number, transmit a verification signal to the embedded controller of the lock, thereby causing a portion of the shank to release from the housing and thus open the lock and enable delivery of the item to the particular location.

2. The system of claim 1, wherein the data image scanner comprises a barcode scanner or a QR code scanner.

3. The system of claim 1, wherein the server is configured to communicate with the embedded controller via wireless communication protocols.

4. The system of claim 1, wherein the lock further comprises a solenoid-operably coupled to the controller, and further wherein the solenoid is configured to receive a signal from the controller to disengage the shank and open the lock.

5. The system of claim 1, further comprising a mobile computing device comprising a mobile computing device processor, wherein the mobile computing device processor is operative to display the position of the lock, said position of the lock being displayed on a screen of the mobile computing device.

6. The system of claim 5, wherein the mobile computing device processor activates a notification upon receipt of a signal initiated from the controller indicating a change of position of the lock.

7. The system of claim 5, wherein the mobile computing device processor is operative to generate a machine-readable dataset comprising the particular tracking number, said machine-readable dataset being displayed on the screen of the mobile computing device so as to be scanned by the scanning interface of the embedded barcode scanner.

8. The system of claim 1, wherein the controller comprises a transceiver configured to transmit and receive data signals.

9. The system of claim 1, wherein prior to receiving the item tracking number, the processor is operative to determine that the position of the lock is closed.

10. The system of claim 1, wherein the machine-readable data is scanned from a barcode or a QR code.

11. A system for secure item delivery, comprising:
 a server;
 a lock comprising a housing defining an internal cavity, wherein an embedded controller and a shank position sensor are disposed within the internal cavity and a shank is at least partially disposed within the internal cavity, further comprising an embedded data image scanner disposed at least partially within the internal cavity and having a scanning interface capable of scanning an item external to the housing, and further wherein the lock is located at a particular location, the embedded controller being in wireless communication with the server and being operative to:
  receive a request at the lock to activate the embedded data image scanner to scan machine-readable data associated with an item for delivery to the particular location;
  scan the machine-readable data associated with the item via the scanning interface of the embedded data image scanner;
  transmit the machine-readable data to the server;
  transmit a position of the lock to the server, wherein the position of the lock is identified by the shank position sensor and defines the shank in a locked position;
  receive a signal at the embedded controller from the shank position sensor, the signal indicating that the shank is in the locked position and that the machine-readable data matches a stored tracking number associated with the item; and
  upon receiving the signal at the embedded controller, causing a portion of the shank to release from the housing and thus open the lock and enable delivery of the item to the particular location.

12. The system of claim 11, wherein the data image scanner comprises a barcode scanner or a QR code scanner.

13. The system of claim 11, wherein the server is configured to communicate with the embedded controller via wireless communication protocols.

14. The system of claim 11, wherein the lock further comprises a solenoid operably coupled to the controller, and further wherein the solenoid is configured to receive a signal from the controller to disengage the shank and open the lock.

15. The system of claim 11, further comprising a mobile computing device comprising a mobile computing device processor, wherein the mobile computing device processor is operative to display the position of the lock, the position of the lock being displayed on a screen of the mobile computing device.

16. The system of claim 15, wherein the mobile computing device processor activates a notification upon receipt of a signal initiated from the controller indicating a change of position of the lock.

17. The system of claim 11, wherein the controller comprises a transceiver configured to transmit and receive data signals.

18. The system of claim 11, wherein prior to scanning the machine-readable data, the embedded controller is operative to determine that the position of the lock is closed.

19. The system of claim 11, wherein the machine-readable data is scanned from a barcode or a QR code.

20. The system of claim 11, wherein the lock further comprises a magnet operatively coupled to the shank position sensor for detecting the position of the shank.

* * * * *